Patented July 24, 1951

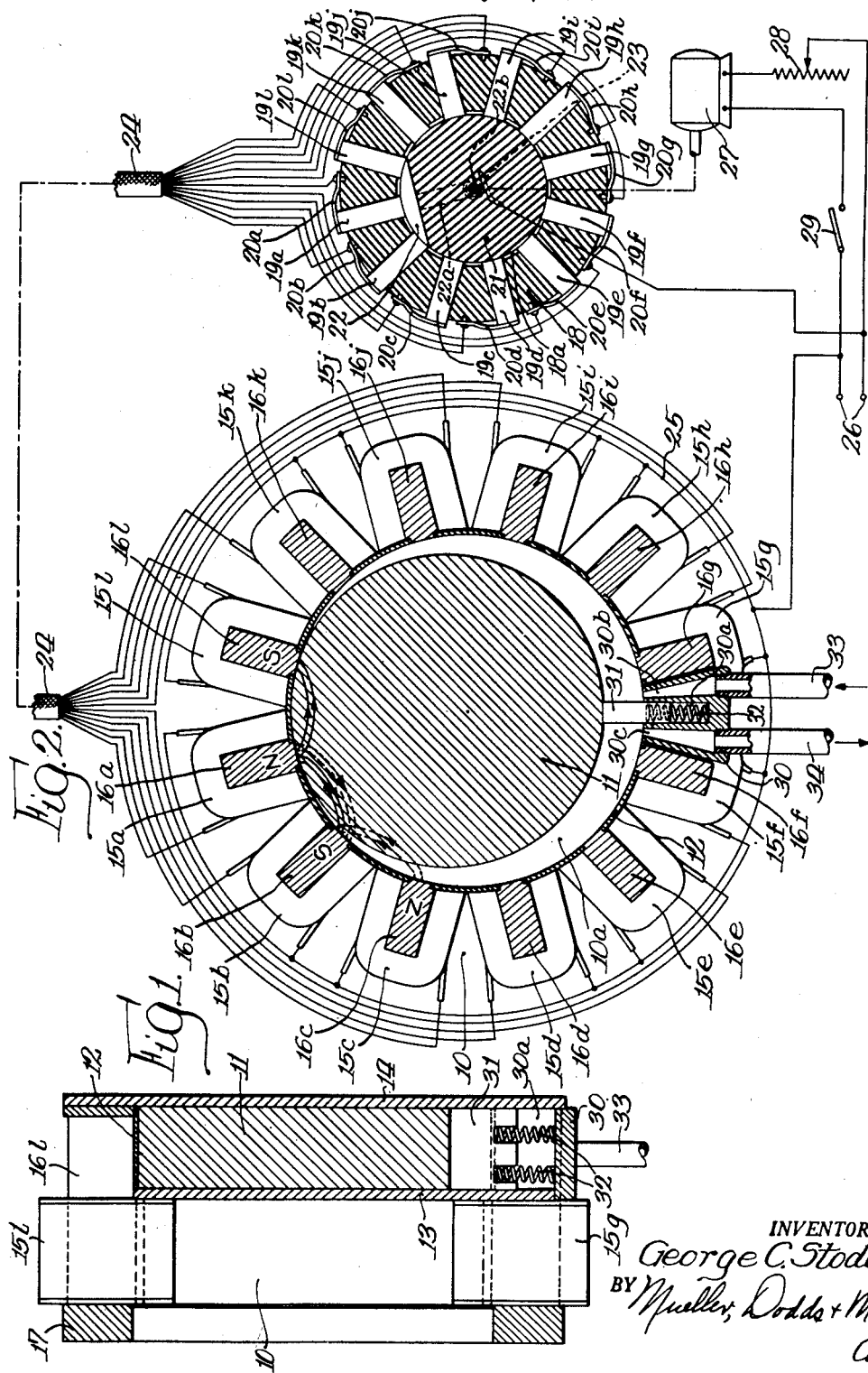

2,561,890

UNITED STATES PATENT OFFICE 2,561,890

DYNAMOELECTRIC MACHINE

George C. Stoddard, New York, N. Y.

Application July 25, 1945, Serial No. 606,977

2 Claims. (Cl. 103—118)

This invention relates to dynamoelectric machines and, while it is of general application, it is particularly adapted for embodiment in a rotary electromagnetic fluid pump and will be specifically described in such an application.

Heretofore, there have been devised numerous forms of electric motor operated fluid pumps. Generally the motor and the pump have been separate units mounted on a common shaft so that the space occupied, the weight, the cost, and the complexity of the combination unit have been the sums of such factors of the two components, while the over-all efficiency of the unit has been the product of the efficiencies of the two components. There has also been proposed a combination motor and pump in which the rotor of the motor constituted also the pumping element. Such combined units have been proposed incorporating pumps of the centrifugal, the rotary, the gear and the screw types. However, while some of these combined units have had limited use, they have not gone into general application primarily because of two factors: (1) The problem has always been approached in terms of a combination of a conventional motor and a conventional pump rather than in terms of an entirely new motor construction or an entirely new pump construction, or both, particularly adapted to the combination. The result has been that the motor has not been particularly adapted to the pump or vice versa and the design has been a compromise. (2) As a corollary of the first factor, the resulting combined motor and pump construction has been complicated, rather than simplified, by the combination and the resulting design again has been a compromise. For example, such a combination of motor and pump has generally complicated the design of the bearings, packings, and inlet and outlet ports for the unit while, on the other hand, it would be highly desirable to provide a combined motor and pump unit in which the bearings and packings are simplified to a maximum extent or even entirely eliminated.

In the operation of a pump of the positive-displacement type, such as a rotary pump, there also frequently arises the problem of unloading the pump in case of excessive back-pressures, such as may be occasioned by obstructions in the outlet connections of the pump, in order to avoid building up of disruptive pressures within the pump chamber. These automatic unloading mechanisms are complicated and costly in construction. Therefore, it is desirable to provide a positive-displacement pump which automatically unloads without the provisions of the accessory unloading devices.

The problems discussed above frequently occur in other motor-driven devices, such as mixers, grinders, crushers, etc., in which it is desired to rotate or gyrate a working element in a chamber sealed from the driving motor structure.

It is an object of the invention, therefore, to provide a new and improved dynamoelectric machine which is effective to overcome one or more of the above-mentioned limitations and disadvantages of such devices of the prior art.

It is another object of the invention to provide a new and improved rotary electromagnetic fluid pump embodying the dynamoelectric machine of the invention.

It is a further object of the invention to provide a new and improved dynamoelectric machine and a rotary electromagnetic fluid pump embodying the same which completely eliminates the requirement of bearings and packings.

In accordance with the invention, a dynamoelectric machine comprises relatively movable field and magnetic armature members, one of the members defining a chamber and the other being of convex configuration and of lesser cross-sectional area than said chamber and disposed for relative gyratory motion within said chamber, and winding means on the field member for producing relative gyratory motion between the members.

Further in accordance with the invention an electromagnetic fluid pump of the rotary type comprises relatively rotatable field and magnetic armature members, one of the members defining a chamber and the other being of convex configuration and of lesser cross-sectional area than the chamber and disposed for relative gyratory motion within said chamber. The pump also includes means for maintaining a partition between the members for all positions of such other member, fluid inlet and outlet ports to the chamber on opposite sides of the partition means, and winding means on the field member for producing relative gyratory motion between the members.

For a better understanding of my invention, together with other and further objects thereof, reference is had to the following description taken in connection with the accompanying drawings while its scope will be pointed out in the appended claims.

Referring now to the drawings, Fig. 1 is a longitudinal sectional view and Fig. 2 a cross-sectional view of a dynamoelectric machine embodying the invention incorporated in an electromagnetic fluid pump of the rotary type.

Referring now to the drawings, there is illustrated a variable-speed dynamoelectric machine comprising relatively movable field and magnetic armature members, one of the members defining a circular cylindrical chamber and the other of the members being of convex configuration, for example of circular cylindrical cross-section, and of lesser cross-sectional area than the chamber. For example, the field member 10 may be the stationary member, defining a circular cylindrical chamber 10a, while the armature member 11 may be the movable member. The chamber 10a of the field member may be formed by a cylindrical sleeve 12 of brass or other non-magnetic material closed by end plates 13 and 14 which may also be of brass or other non-magnetic material. The armature 11 is disposed for gyratory motion within the chamber 10a; that is it has complete freedom of motion transverse to its axis and is of an axial length equal to the distance between the end plates 13 and 14 so that it completely fills the axial space therebetween.

The field member 10 is provided with winding means for producing relative gyratory motion between the field and armature members, specifically for causing the armature member 11 to roll around the inner periphery of the chamber 10a. This winding means may be of any suitable type but there is shown by way of example a plurality of bipolar exciting magnets 15a-15l, inc., peripherally arranged and equally spaced around the field member 10, each with one pole adjacent the chamber 10a. For example, the magnets 15a-15l, inc., may be provided with elongated magnetic cores 16a-16l, inc., respectively, on which the windings are mounted, the magnetic cores extending parallel to the axis of the structure with one end of each overlying the cylinder 12 defining the chamber 10a. The field member 10 also includes a continuous magnetic yoke or ring 17 of magnetic material engaging the other ends of the several magnetic cores 16a-16l, inc., for completing the magnetic circuits of the several magnets.

The dynamoelectric machine of the invention also includes commutating means for successively exciting the magnets 15a-15l, inc., in groups progressing around the periphery of the field member with their poles adjacent the chamber 10a of alternating polarities, thereby to produce an asymmetric magnetic field across the chamber 10a, rotationally shifting to effect the relative gyratory or rolling motion of the armature member 11. This commutating means again may be of any suitable type but there is illustrated in Fig. 2, by way of example, a commutator comprising a cylindrical body 18 of insulation material in which are slidably mounted a plurality of radially extending contact brushes 19a-19l, inc., being provided with spring contact terminals 20a-20l, inc., respectively, for maintaining pressure on the contact brushes and providing external circuit connections. The body 18 has a cylindrical bore 18a in which is disposed a rotatable contact structure comprising a body portion 21 of insulation material having a segmental contact element 22 secured thereto and of such an extent that in all angular positions it bridges a plurality, for example three, of the several brushes 19a-19l, inc. The contact element 22 is also provided with a conductive extension 22a terminating in a contact slip ring 22b, on which bears a brush 23.

The several spring contact elements 20a-20l, inc. are individually connected to one of the terminals of the windings 15a-15l, inc., respectively, by a group of conductors which may be in the form of a cable 24. The other terminals of the windings 15a-15l, inc., are connected to a common conductor or bus 25 which is connected to one side of a suitable supply circuit 26 which may be either direct or alternating current and of any desired voltage. The other side of the supply circuit 26 is connected directly to the contact brush 23. In order that the poles of the electromagnets 15a-15l, inc., adjacent the chamber 10a and acting on the armature member 11 may be of alternate polarities, the successive windings 15a-15l, inc., are connected through the commutating means with alternate polarities as indicated in Fig. 2; that is, corresponding terminals of the several windings are alternately connected to the common bus conductor 25 and, via the cable 24, to the contact elements 20a-20l, inc., of the commutator structure.

In order to determine the speed of the dynamoelectric machine described, there is provided an auxiliary motor 27, which may be of only nominal power rating, energized from the supply circuit 26 through a manually adjustable resistor 28 and a switch 29 for initiating and stopping operation of the machine. The motor 27 is connected to drive the rotor 21 of the commutator by any suitable driving connection as indicated schematically by the dot-dash line interconnecting the motor shaft and the rotor 21.

It is believed that the operation of the dynamoelectric machine of the invention will be apparent to those skilled in the art from the foregoing description. In brief, assuming the parts to occupy the positions illustrated in the drawings, it is noted that the contact element 22 of the contact structure is effective to connect the brushes 19l, 19a and 19b to one side of the supply circuit 26 and this connection is completed through the contact elements 20l, 20a and 20b, respectively, and the cable 24 to one terminal of each of the windings 15l, 15a and 15b, respectively, through the windings and their other terminals to the common bus conductor 25, thence to the other side of the circuit 26. It will be assumed that, with the connections described, the polarity of the core 16a adjacent the chamber 10a is north, while that of the cores 16b and 16l adjacent the chamber 10a is south. The magnetic field through the chamber 10a and the armature member 11 will then be in the form of the solid arrowed lines of Fig. 2. The action of this field, as is well understood in the art, is to attract the armature 11 to the position shown in Fig. 2 so as to reduce to a minimum the reluctance of the magnetic circuits between the magnets 15a and 15b and between the magnets 15a and 15l.

If it be assumed that the contact structure 21 of the commutating means rotates in a counterclockwise direction, a short time interval later the contact element 22 will have moved from the brush 19l and made contact with the brush 19c. The result is that the electromagnets 15a, 15b and 15c are now energized and their magnetic fields are represented by the dashed arrowed lines. The result is to attract the armature 11 from the position shown in Fig. 2 to a position in which it is tangent to the wall of the chamber 10a directly beneath the electromagnet 15b. In a similar manner, as the commutating means is driven by the motor 27, there is developed a magnetic field which is asymmetrical with respect to the chamber 10a, that is one that does not pass through the diameter of the chamber as in the case of a conventional rotating-field electric motor, and this field rotationally shifts about the axis of the chamber 10a, attracting the armature 11 with it. As a result, the armature 11 is given a gyratory motion within the chamber 10a, rolling around the inner wall of the chamber and thus having a component of angular motion about its own axis in a reverse direction, that is in a clockwise direction, but at a very much lower angular velocity.

The dynamoelectric machine of the invention so far described is suitable for a variety of uses. For example, if mounted to gyrate about a vertical axis and the top end plate 14 removed, the construction would serve as a mixer, grinder, etc., in which the materials to be processed are disposed in the chamber 10a. However, the dynamoelectric machine of the invention is particularly suitable for embodiment in an electromagnetic fluid pump of the rotary type in which the chamber 10a serves as the pump chamber. The structure so far described may be readily adapted for operation as a pump by providing means for maintaining a partition between the field and armature members for all positions of the movable member and disposing fluid inlet and outlet ports to the chamber 10a on opposite sides of the partition means. This construction is shown in Figs. 1 and 2 in which the cylinder 12 defining the chamber 10a is provided with a radially extending member 30 disposed between the magnets 15f and 15g and extending axially the distance between the end plates 13 and 14. The member 30 is provided with a radially extending recess 30a of rectangular cross-section in which is disposed a vane 31 which is biased or pressed into engagement with the armature 11 by any suitable means, such as one or more springs 32. The member 30 is also provided with a pair of radially extending ports 30b and 30c, disposed closely adjacent opposite sides of the vane recess 30a. Inlet and outlet fluid connections 33 and 34 are connected to the inlet and outlet ports 30b and 30c, respectively.

With the dynamoelectric machine operating as described above, the gyratory motion of the armature member 11 cooperating with the vane 31 and the inlet and outlet ports 30b, 30c, respectively, comprises a rotary pump operating in a conventional manner so that a detailed description is unnecessary. The operation in one respect is, however, unconventional. It is well known that the rotary type pump is a positive-displacement pump and that, in the operation of such pumps, if any obstruction occurs in the fluid outlet connections, disruptive pressures may be developed in the pump structure. In the fluid pump described above, however, the attraction of the magnet armature member 11 to any particular position is limited by the strength of excitation of the electromagnets 15a–15l, inc. Therefore, if any obstruction occurs in the outlet connection 34 which is effective to build up a back-pressure in excess of the attractive force of the magnets, the armature member 11 fails to maintain contact with the periphery of the chamber during its revolution and merely gyrates or wobbles within the pump chamber without pumping. It will be understood that the maximum output pressure which the pump is capable of delivering may be controlled by the design of the magnets effecting its gyratory motion. This characteristic of the pump of the invention may be considered as a form of automatic unloading.

It will also be understood that the pressure delivered and the volume output of the pump may be determined by the relative diameters of the pump chamber 10a and the armature member 11, by their axial lengths, and by the speed of rotation of the armature member 11 as determined by the speed of the commutator means, in accordance with the design practice of conventional rotary pumps.

It will be seen also that the rotary pump of the invention described completely eliminates the requirement of bearings and packings, thus greatly increasing the simplicity and reducing the cost of the apparatus. Furthermore, friction and wear are correspondingly reduced to a minimum, consisting only of the friction of the armature 11 rolling around within the periphery of the pump chamber 10a. Generally the armature 11 may be lubricated entirely by the fluid being pumped although, in case the pump is working on a gaseous fluid, some additional lubricant may be desirable.

In certain applications where the use of bearings and packings is not objectionable, the commutator structure may be driven directly by the armature through a crank and shaft extending through one of the end plates 13 or 14. With this connection the pump will have a characteristic somewhat similar to that of a direct-current series motor and will operate at a speed varying inversely with the back-pressure on the pump.

While there has been described what is at present considered to be the preferred embodiment of the invention, it will be apparent to those skilled in the art that various changes and modifications may be made therein without departing from the spirit or scope of the invention.

What is claimed as new is:

1. An electromagnetic fluid pump of the rotary type comprising, relatively movable field and magnetic armature members, one of said members defining a pump chamber and the other being of convex configuration and of lesser cross-sectional area than said chamber and disposed for relative gyratory motion with respect to and within said chamber, a vane mounted in and radially slidable with respect to said chamber member and disposed to engage said other member to form a partition therebetween, fluid inlet and outlet ports to said chamber on opposite sides of said vane, a plurality of exciting magnets peripherally arranged around said field member, a rotary commutator including a plurality of conductive elements individually connected in circuit with said electromagnets and electrically insulated from said armature and field members, and means for driving said commutator to excite said electromagnets successively for producing an asymmetric magnetic field across said chamber rotationally shifting to effect said relative gyratory motion.

2. An electromagnetic fluid pump of the rotary type comprising, a stationary cylindrical field member defining a pump chamber, a rotatable cylindrical magnetic armature member of lesser cross-sectional area than said chamber and disposed for gyratory motion with respect to and within said chamber, a vane mounted in and radially slidable with respect to said chamber member and disposed to engage said other member to form a partition therebetween, fluid inlet and outlet ports to said chamber on opposite sides of said vane, a plurality of exciting magnets peripherally arranged around said field member, a rotary commutator including a plurality of conductive elements individually connected in circuit with said electromagnets and electrically insulated from said armature and field members, and means for driving said commutator to excite said electromagnets successively for producing an asymmetric magnetic field across said chamber rotationally shifting to effect said gyratory motion.

GEORGE C. STODDARD.

REFERENCES CITED

The following references are of record in the file of this patent:

UNITED STATES PATENTS

| Number | Name | Date |
|---|---|---|
| 586,823 | Patten | July 20, 1897 |
| 677,308 | Eickemeyer | June 25, 1901 |
| 730,891 | Eickemeyer | June 16, 1903 |
| 735,118 | Langdon-Davies et al. | Aug. 4, 1903 |
| 1,486,965 | Janney | Mar. 18, 1924 |
| 1,495,784 | Fereday | May 27, 1924 |
| 1,892,217 | Moineau | Dec. 27, 1932 |
| 2,085,115 | Moineau | June 29, 1937 |
| 2,161,374 | Moineau | June 6, 1939 |
| 2,290,137 | Aldridge | July 14, 1942 |
| 2,358,721 | Ljungdahl | Sept. 19, 1944 |
| 2,399,856 | Coger | May 7, 1946 |

FOREIGN PATENTS

| Number | Country | Date |
|---|---|---|
| 59,554 | Netherlands | June 16, 1947 |
| 165,137 | Great Britain | June 21, 1921 |
| 895,214 | France | Mar. 27, 1944 |

OTHER REFERENCES

"Thompson's Dynamo Electric Machinery": vol. II; published by Spon and Chamberlin, London, 1904, page 660.

"Induction and Synchronous Motors with Unlaminated Rotors": by Gibbs; Jl. Inst. E E, Part II, August 1948, pages 411–420.